EDGAR W. IRVING JR. and
GEORGE R. PERKINS
INVENTORS

EDGAR W. IRVING JR. and
GEORGE R. PERKINS
INVENTORS

United States Patent Office 3,461,016
Patented Aug. 12, 1969

3,461,016
APPARATUS FOR MAKING DECORATIVE PLASTIC ARTICLES
Edgar W. Irving, Jr., Brookside Drive, and George R. Perkins, King George Road, R.F.D. 1, both of Bound Brook, N.J. 08805
Filed Oct. 8, 1965, Ser. No. 494,126
Int. Cl. B29c *21/00;* B29d *9/00*
U.S. Cl. 156—376                        8 Claims

ABSTRACT OF THE DISCLOSURE

Apparatus for forming an interstitial plastic sheet having a predetermined repetitive pattern of openings extending therethrough, which apparatus includes an endless band, an applicator roll which applies adhesive to portions of the band surface, the uncoated portions of the band surface corresponding to the defined openings, a first hopper which applies thermoplastic granules to the band to form an interstitial layer of granules adhering to the coated portions of the band, means removing excess granules, means heating the granules to their softening point, means cooling the granules to thereby fuse them together and means stripping the sheet from the band. A second hopper can be employed to apply additional granules filling the openings in the sheet, along with concomitant heating and cooling means.

---

This invention relates to the manufacture of decorative plastic articles and sheets having a filigree type pattern and more particularly to an apparatus for forming such articles and sheets in a continuous process and with multicolored patterns.

In accordance with one embodiment of this invention, granules of thermoplastic materials are softened and formed into a continuous interstitial sheet of pleasing appearance. During the formation of the sheet, openings of predetermined shape are formed therethrough, which openings may then be filled with plastic granules of a desired color. Under the action of heat, the colored granules are fused to each other and to the granules defining the openings in the sheet, thereby resulting in what may be termed inlaid patterns. Such patterns may be of one or various colors. The continuously-formed sheet may then be cut into sheets of desired shape and size for specific uses as, for example, place mats, or the sheets may be further processed by various operations such as drape forming, laminating, etc.

In accordance with another embodiment of the invention, individual, relatively-flat articles may be formed, with or without colored patterns, which articles also are of interstitial configuration.

An object of this invention is the provision of an apparatus for forming thermoplastic granules into articles and sheets having novel decorative effects.

An object of this invention is the provision of an apparatus for forming thermoplastic granules into a multicolored sheet having a filigree type pattern.

An object of this invention is the provision of apparatus for forming thermoplastic granules into an interstitial sheet having openings of predetermined shape formed therein, which openings then may be filled with granules of another color to provide inlaid patterns having an interstitial configuration similar to that of the sheet.

These and other objects and advantages of the invention will become apparent from the following description when taken with the accompanying drawings. It will be understood, however, that the drawings are for purposes of illustration and are not to be construed as defining the scope and limits of the invention, reference being had for the latter purpose to the claims appended hereto.

In the drawings wherein like reference characters denote like parts in the several views:

FIGURE 4 is a top plan view showing the various forms of the sheet as it passes through the machine;

Figure 1:
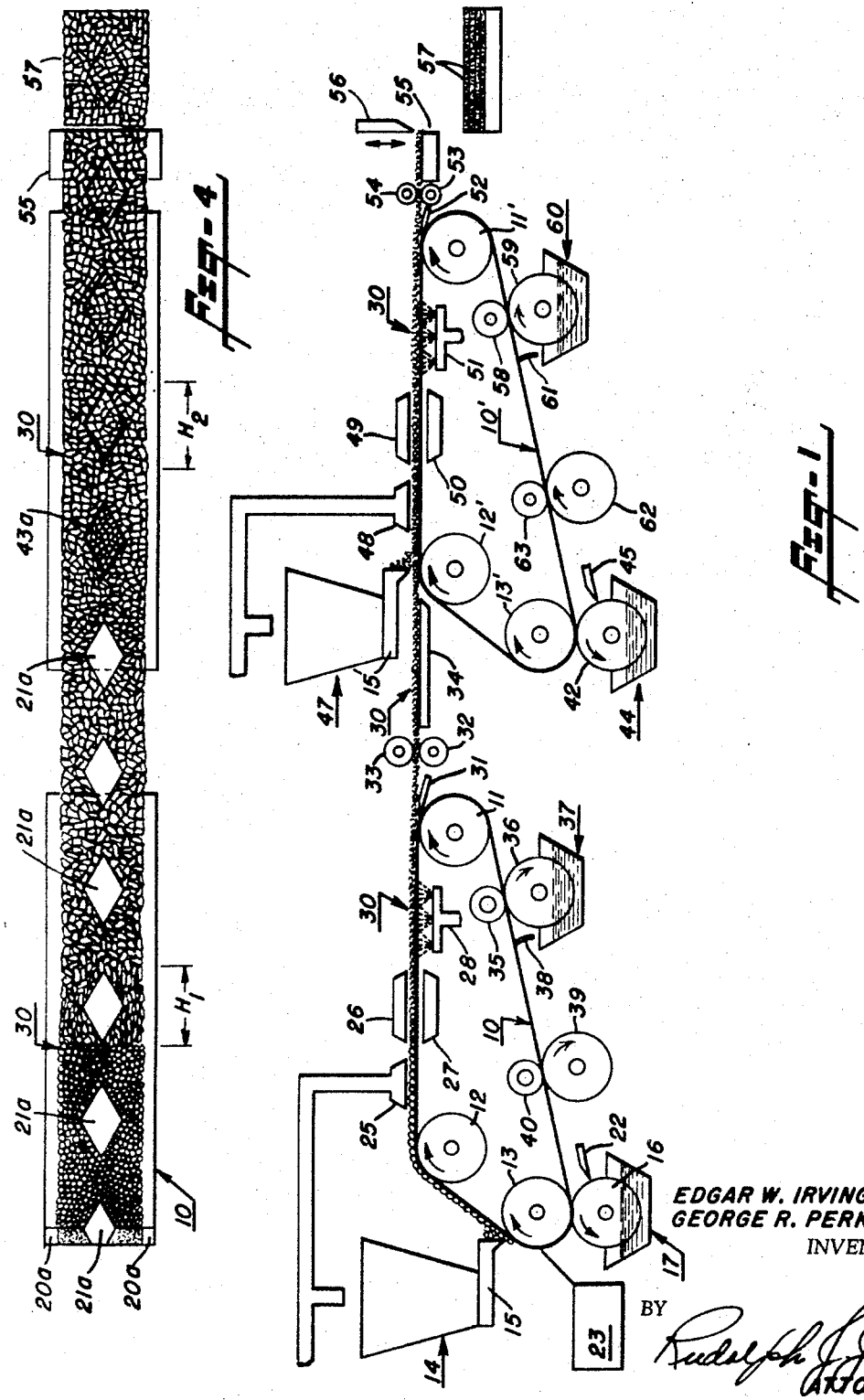
FIGURE 1 is a diagrammatic view, in side elevation, of a machine made in accordance with this invention.

Reference now is made to FIGURE 1 which shows two endless bands 10, 10' driven by the associated drive rolls 11, 11', said bands preferably being made of stainless steel. The band 10 is disposed in the first stage of the machine and the band 10' is disposed in the second stage, and the drive rolls are mechanically coupled by suitable means such as, for example, sprockets and a chain, whereby the two bands move in synchronism. Referring specifically to the band 10, such band passes over a pair of spaced, parallel idler rolls 12 and 13. A supply hopper 14, having a discharge chute 15 spaced from the inclined portion of the band, contains pellets, or granules, of a thermoplastic material, which granules may be of regular or irregular size and shape. For present purposes, it will be assumed these granules are of a clear plastic.

Figure 2:
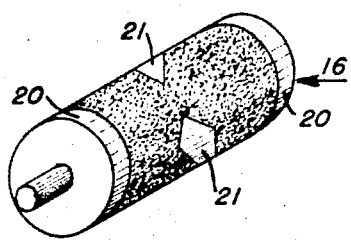
FIGURE 2 is an enlarged isometric view showing the applicator roll of the first machine stage.
Figure 3:
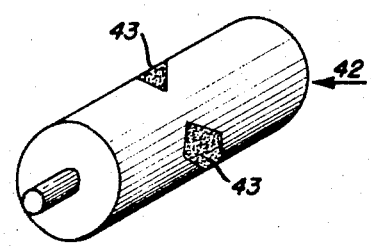
FIGURE 3 is a similar view of the applicator roll of the second machine stage.

An applicator roll 16, power driven to rotate in synchronism with the band 10, cooperates with the idler roll 13 and is partially immersed in a suitable liquid adhesive contained in the trough 17. The surface of this roll is formed into a desired design as by engraving or chemical etching, see FIGURE 2. Specifically, in the illustrated design, the surface of the roll is etched away, or otherwise depressed, leaving the raised marginal edges 20 and the diamond-shaped designs 21. Upon rotation of the roll, its surface is coated by the adhesive. Prior to the point of contact between the coated roll surface and the band 10, the adhesive coating is scraped from the raised portions of the roll by a doctor blade 22, thereby leaving the adhesive on the entire roll surface, with the exception of the areas identified by the numerals 20 and 21. It will be apparent that as the band moves between the rolls 13 and 16, the outer surface thereof will be coated with the adhesive except along the side edges and the spaced, diamond-shaped areas. This condition is shown in the plan view of FIGURE 4, wherein the uncoated edges of the band are identified by the numerals 20a and the uncoated diamond design by the numeral 21a.

Figure 5:
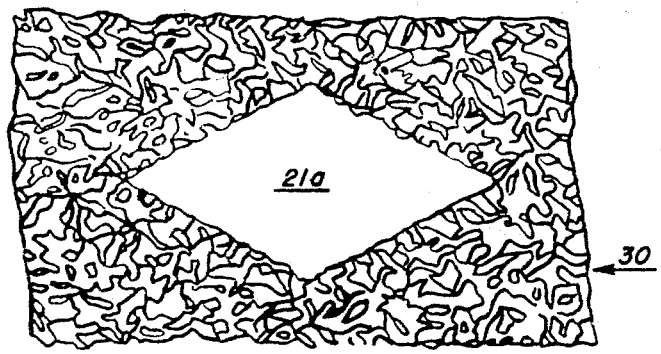
FIGURE 5 is an enlarged, fragmentary plan view showing the sheet as formed in the first stage of the machine.

The plastic granules are discharged from the hopper discharge chute along the entire width of the band 10 and at a rate such that the adhesive-coated portions of the band will have granules adhering thereto. It may here be pointed out that the hopper discharge chute may be vibrated to assure a continuous discharge of granules and that the excess granules, that is, those which are not retained in place by the adhesive, fall into a suitable container 23. As the granule-coated portion of the band passes under a hood 25, additional loose granules are removed and returned to the hopper by means of a suitable vacuum arrangement. Those granules which adhere to the band are in the form of an interstitial layer, which layer passes through a heating station comprising suitable heating means 26, 27. The amount of heat and the length of time during which it is applied to the granules will depend upon the particular thermoplastic material and the granule size. In any event, the granules are heated just to the softening point so that upon subsequent cooling as, for example, by a water spray arrangement 28, the engaged surfaces of adjacently-disposed granules will fuse together. At this point in the process, there is formed an interstitial sheet 30, see FIGURE 4, which sheet has spaced, diamond-shaped openings 21a extending therethrough, which openings correspond to the uncoated areas of the band 10. Such sheet will have the general appearance as shown in the enlarged, fragmentary view of FIGURE 5. It will be noted that the diamond-shaped opening 21a is defined irregularly, but distinctly, by the fused granules forming the sheet.

As shown in FIGURE 4, the heating station is identified by the letter ($H_1$). To the left of the heating station, the granules adhering to the band 10 are shown of fairly regular form, for purposes of illustration, whereas to the right of this heating station the granules are shown in a more or less mottled effect inasmuch as they are fused together.

With continued reference to FIGURE 1, the formed interstitial plastic sheet 30 is separated from the band 10 by means of a suitable stripper blade 31. The sheet now progresses between a pair of pull rolls 32, 33, along a supporting surface 34 and to the second stage of the machine. The stripped portion of the band passes between a pair of cooperating rolls 35, 36, the latter roll being partially immersed in a suitable cleaning fluid contained in the trough 37. Preferably, the roll 36 is power driven in a direction reverse to that of the travel of the band and at a somewhat greater speed than that of the band, thereby to remove any remaining adhesive from the outer surface thereof. A squeegee 38 removes the cleaning fluid from the band. If necessary, in view of the particular adhesive used, the band surface may be buffed by a buffing wheel 39 cooperating with the idler roll 40.

The second stage of the machine is constructed and arranged generally similar to the first stage. In this case, however, the applicator roll 42, see also FIGURE 4, carries a plurality of diamond-shaped designs 43 which are depressed slightly below the roll surface. Each of these designs is somewhat larger than the diamond-shaped openings formed in the interstitial sheet 30. Upon rotation of the roll 42, its surface becomes coated by the adhesive contained in the trough 44. The doctor blade 45 removes the adhesive coating from the roll surface, leaving adhesive only on the depressed areas defined by the diamond-shaped designs 43. Corresponding areas of the adhesive are transferred to the outer surface of the band 10'. The movement of the bands 10, 10' and the applicator roll 42 are synchronized so that the diamond-shaped openings 21a extending through the sheet 30, see also FIGURE 4.

A second hopper 47 has a discharge chute to direct a flow of thermoplastic granules onto the sheet 30, which granules preferably are of a color different from that of the formed sheet. In the specific case illustrated, wherein the diamond-shaped openings 21a are formed in the sheet, the discharge chute of this hopper is constructed and positioned so that the granules will fall into and fill such openings. The granules may flow from the hopper in a continuous stream, or the hopper may be provided with a suitable gate operated in timed sequence with movement of the sheet 30, whereby granules are discharged from the hopper only as the diamond-shaped openings pass under the chute. In any event, the openings are filled with the colored granules. Excess granules, that is, those which do not adhere to the diamond-shaped coated surface portions of the band, are removed and returned to the hopper by a suitable vacuum arrangement having a hood 48. The opening filled with the colored granules is identified by the numeral 43a in FIGURE 4.

Figure 6:
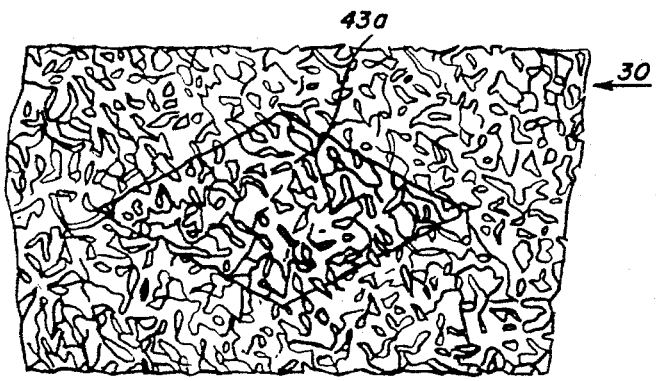
FIGURE 6 is a similar view of the finished sheet.

The openings now being substantially filled with the colored granules, the sheet 30 passes through a heating station comprising suitable heating means 49, 50. These granules, as well as those forming the sheet, are heated to the softening point. Upon cooling, as by the water spray arrangement 51, the contacting surfaces of all of the granules fuse together, thereby resulting in a finished sheet. In FIGURE 4, the heating station, of the second stage of the machine, is identified by the letter ($H_2$). To the left of the heating station, the granules filling the diamond-shaped opening, are shown in heavy lines of regular shape, for purposes of illustration. To the right of the heating station, the granules are shown in a more or less mottled effect inasmuch as they are fused together. The finished sheet now has the general appearance shown in the enlarged fragmentary view of FIGURE 6, it being noted that the colored granules 43a fill the diamond-shaped opening 21a, see FIGURE 5, and that the colored granules form an interstitial design of the same character as the rest of the sheet.

The finished sheet, having the colored inlaid designs, is separated from the band 10' by means of a suitable stripper blade 52, passes between the pull rolls 53 and 54 and over a cutting table 55. The sheet may be cut, by means of a blade 56, into smaller sheets 57, each cut sheet having a desired number of the diamond-shaped designs. The stripped portion of the band passes between a pair of cooperating rolls 58, 59, the latter roll being partially immersed in a suitable cleaning fluid contained in the trough 60. The cleaning fluid is removed from the band surface by a squeegee 61. If necessary, the band surface may be buffered by a buffing wheel 62 cooperating with an idler roll 63.

The described process and apparatus are adapted for the manufacture of a functional and decorative plastic sheet having a multicolored and patterned configuration in an unlimited number of patterns and color combinations. The texture of the sheet is controlled by the size, shape and composition of the granules, as well as by the temperature to which they are heated.

The sheet may be formed continuously, and then cut into smaller sheets, as described, or individual sheets may be formed by suitably gating the flow of granules from the hoppers. In either case, the sheet may have a desired width with a plurality of the same, or different patterns, extending across the full width thereof. The different colored granules can be carried by individual hoppers having chutes oriented to direct the flow of the colored granules to the adhesive-coated portions of the bands. Alternatively, additional stages may be incorporated in the machine for this purpose. Specifically, and only by way of illustration, the first stage of the machine would form the interstitial sheet of white plastic granules, such sheet having the described diamond-shaped openings formed therein. At the second stage of the machine, alternate openings would be filled with red granules, and the remaining openings would be filled with blue granules at the third machine stage.

It will also be apparent that a multicolored sheet may be formed by utilizing only the first stage of the machine. For example, and with reference to FIGURE 1, the applicator roll 16 may have a smooth surface, that is, without the marginal and diamond-shaped patterns. This will result in the entire, outer surface of the band 10 becoming coated with the adhesive. In this case, the hopper 14 carries granules of different colors, which granules are thoroughly mixed within the hopper. This will result in the formation of an interstitial, variegated sheet.

As shown in FIGURE 1, each of the endless bands 10, 10' pass along inclined planes between the respective idler rolls 12, 13 and 12', 13'. It will be apparent that the idler rolls 13 and 13' may be eliminated and the bands arranged to travel in horizontal planes, without effecting operation of the machine. In such case, the band 10 will pass between the drive roll 11 and the single idler roll 12, the applicator roll 16 will be arranged to cooperate with such idler roll to transfer the adhesive onto the outer surface of the band, and the hopper 14 will be disposed above the belt so that its discharge chute will direct the flow of granules onto the horizontal portion of the band in the same manner as the hopper 47 shown in the second stage of the machine. The applicator roll 42, of the second stage, also will be arranged to cooperate with the single idler roll 12' to transfer the adhesive onto the outer surface of the band 10'.

Figure 7:
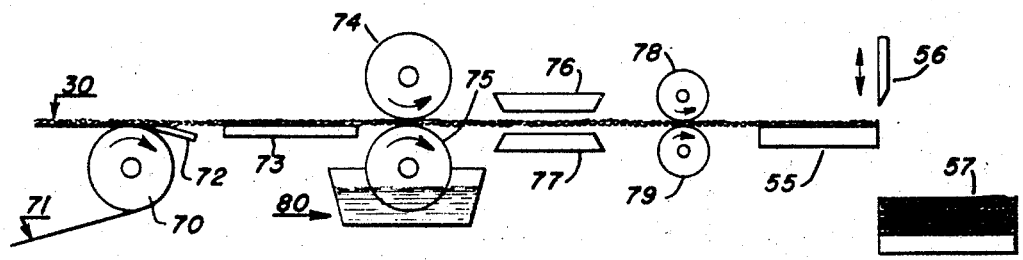
FIGURE 7 is similar to FIGURE 1 but showing a final machine stage for cleaning the finished product.

Depending upon the character of the particular adhesive and granules, it may be desirable to provide a product cleaning stage on the machine, as shown in FIGURE 7. This figure includes a drive roll 70, endless band 71 and stripper blade 72 of the last product-forming stage of the machine. The formed sheet 30 passes over a supporting surface 73, between cleaning rolls 74, 75, through a drying station comprising suitable heating means 76, 77, between a pair of pull rolls 78, 79, and over the cutting table 55. The cleaning roll 75 preferably is a power-driven brush rotatable in a suitable cleaning liquid contained in the trough 80, thereby to remove any adhesive clinging to the lower surface of the finished sheet.

In the continuously-formed sheet, as above described, the openings defining the pattern are filled with granules. Such openings may, of course, be left unfilled. Also, instead of forming a continuous sheet which is cut into smaller sheets, the smaller sheets may be formed directly. Specifically, the applicator roll 16, in the first machine stage, may have its surface so formed as to apply to the band adhesive-coated areas which are separated by uncoated areas extending across the full width of the band. In such arrangement, smaller size sheets are formed, in succession, each sheet having, if desired, pattern openings extending therethrough, which openings are then filled with granules of a desired color in the following stages of the machine.

Also, instead of forming individual sheets, the first stage of the machine may be arranged to form individual, relatively-flat articles having a desired shape, with or without the colored inlays. For example, the first applicator roller may be arranged to apply to the band spaced adhesive-coated areas in the shape of Christmas trees, each having openings, of various shapes, extending therethrough. The trees may be formed with green granules and the openings filled with colored granules, in subsequent machine stages, to simulate colored ornaments.

We claim:
1. Apparatus for forming an interstitial plastic sheet having defined openings extending therethrough, which openings constitute a predetermined, repetitive pattern, said apparatus comprising:
   (a) an endless band,
   (b) an applicator roll for continuously applying an adhesive coating to portions of the outer surface of the band, the uncoated portions of the band surface corresponding to the said defined openings,
   (c) a first hopper discharging thermoplastic granules onto the adhesive coated surface of the band at a rate to form a relatively-thin, interstitial layer of granules adhering to the coated portions of the band,
   (d) means removing loose granules from the band,
   (e) means heating the granules to the softening point,
   (f) means cooling the granules, thereby to fuse them together at their points of contact with each other and resulting in a unitary, interstitial plastic sheet having defined openings extending therethrough, which openings correspond to the uncoated portions of the band surface, and
   (g) means stripping the sheet from the band.
2. The invention as recited in claim 1, including a second hopper discharging additional granules into the said defined openings of said sheet after said sheet has been cooled, said second hopper discharging granules at a rate to form relatively-thin, interstitial layers of granules filling said openings; means retaining the layers of said additional granules within the said openings; second means heating the sheet and additional granules to the softening point; and means cooling the sheet and additional granules.

3. The invention as recited in claim 1, including means directing the band along an inclined plane at a point beyond the said applicator roll, and wherein the said first hopper discharges granules onto the coated portion of the band along the said inclined plane.

4. The invention as recited in claim 1, including means removing the remaining adhesive from the stripped portion of the band ahead of said applicator roll, and means removing the adhesive from the sheet after it has been stripped from the band.

5. Apparatus for forming a plastic sheet comprising:
   (a) a first endless band,
   (b) a first applicator roll for continuously applying an adhesive coating to the outer surface of the band, portions of said band surface being uncoated to form a predetermined pattern,
   (c) a first hopper discharging thermoplastic granules onto the adhesive coated surface of the band,
   (d) a first means removing granules which do not adhere to the band,
   (e) a first means heating the granules to the softening point,
   (f) a first cooling means cooling the granules, thereby fusing them together at their points of contact with each other to form a sheet having openings extending therethrough, which openings correspond to the uncoated pattern formed on the outer band surface,
   (g) a second endless band,
   (h) a second applicator roll continuously applying an adhesive to the outer surface of said second band, which coating has a pattern corresponding to the said openings in the said sheet,
   (i) means transferring said sheet to said second band with the said openings in registry with the adhesive pattern applied to the second band,
   (j) a second hopper discharging additional thermoplastic granules to fill the openings in the said sheet,
   (k) a second means removing granules which do not adhere to the second band,
   (l) a second heating means heating the said sheet and additional granules to the softening point, and
   (m) means cooling the said granules and sheet, thereby completing the formation of the sheet.

6. The invention as recited in claim 5, wherein the said additional granules are of a color different from those discharged by the said first hopper.

7. The invention as recited in claim 5, including means removing remaining adhesive from the said bands prior to the application of the adhesive thereto by the associated applicator rolls.

8. The invention as recited in claim 5, including means removing adhesive from the completed sheet, and means drying the completed sheet.

References Cited

UNITED STATES PATENTS

| 2,466,906 | 4/1949 | Miller | 117—17 XR |
| 2,761,177 | 9/1956 | Walters | 156—279 |
| 2,784,630 | 3/1957 | Koprow et al. | 117—17 XR |
| 2,900,270 | 8/1959 | Klein | 117—25 |
| 3,152,002 | 10/1964 | Wisotzky et al. | 117—21 |
| 3,308,226 | 3/1967 | Simjian | 156—63 XR |
| 3,325,574 | 6/1967 | Stadden | 161—162 XR |
| 3,343,975 | 9/1967 | Daneski et al. | 117—13 |

ROBERT F. BURNETT, Primary Examiner

R. H. CRISS, Assistant Examiner

U.S. Cl. X.R.

117—25; 118—310; 156—62, 377; 161—109, 162; 264—126